C. E. ALBRO.
Tool-Holder for Lathes.

No. 134,343. Patented Dec. 31, 1872.

UNITED STATES PATENT OFFICE.

CHARLES E. ALBRO, OF SYRACUSE, NEW YORK.

IMPROVEMENT IN TOOL-HOLDERS FOR LATHES.

Specification forming part of Letters Patent No. 134,343, dated December 31, 1872.

*To all whom it may concern:*

Be it known that I, CHARLES EDWARD ALBRO, of Syracuse, Onondaga county, New York, have invented certain Improvements in Tool Chucks or Holders for holding tools for turning, threading-screws, or for other purposes where such a tool is applicable, of which the following is a specification:

My invention consists of a tool chuck or holder for holding tools made of thin strips of steel of proper width and form for the cutting-edge of the tool at top, and made thinner for clearance at its lower edge, its depth being sufficient for the strength required, or its sides for some purposes may be parallel, the cross-section being the same throughout its entire length, by which I effect a great economy of material and manufacture in properly forming the cutter, while I attain all the strength and firmness of a heavy shank, such as is required in tools of ordinary construction.

Figure 1:
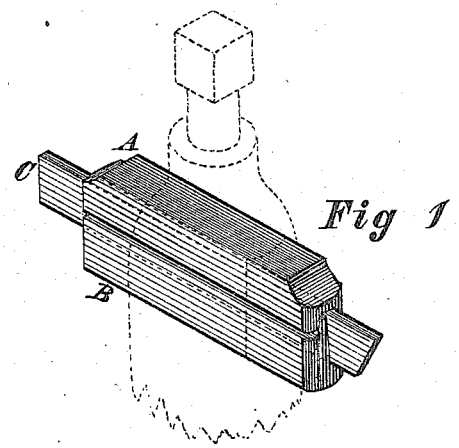
Figure 2:

The construction is as follows: I take an oblong piece of metal, B, Figure 1, and form a deep narrow groove, b, therein, sufficient to receive the tool C, which is a straight narrow slip of steel of equal cross-section throughout its whole length, as clearly shown in the drawing C, Fig. 1. This groove may be made with its sides parallel, or one side may be made inclined equal to the gain desired for clearance, or wedge-shaped slips may be inserted in the parallel groove to give the tool inclination on the cutting-side, and in cases where the tool is thinner than the groove a slip of metal, e, Fig. 2, may be inserted beside it to properly fill the groove. On each side of the groove b I chamfer off the edge of the block B from end to end, so as to leave the surfaces inclined, as clearly shown in the drawing, like a truncated wedge. Over this I fit a cap-piece, A, with a groove, d, Fig. 2, therein, which is a counterpart to the wedge-surface of the block B, and so fitting it as that when the cap A is forced down upon it the sides of the groove b will be sprung toward each other so as to pinch and firmly hold and support the tool C on all sides. The tool, as before described, is a plain piece of forged or rolled steel, the right width and thickness for the cutting-point for the work for which it is intended, and the inclined side for clearance in screw-cutting must be equal to the gain of the thread. It will be perceived that the tool-chuck can be made, as in the drawing, with both ends alike in form, so as to be reversed end for end in the tool-post, the tool also having a cutting-point formed on the opposite end. This will bring the clearance on the opposite side, and enable the workman to cut a right or left hand screw with the same tool by merely reversing ends.

I claim as my invention in the above-described tool—

1. The tool chuck or holder, constructed substantially as and for the purposes herein set forth.

2. The employment of the wedges in the groove of the tool-holder for giving an inclination to the tool, as above specified.

3. The combination of the tool-chuck and tool, constructed and arranged substantially as above specified, for the purposes described.

CHAS. E. ALBRO.

Witnesses:
    J. J. GREENOUGH,
    STANLEY BAGG.